(12) United States Patent
Sugahara et al.

(10) Patent No.: US 6,799,219 B1
(45) Date of Patent: Sep. 28, 2004

(54) METHOD AND APPARATUS FOR AVOIDING STARVATION IN COMPUTER NETWORK (75) Inventors: Hirohide Sugahara, Kawasaki (JP);
Takashi Miyoshi, Campbell, CA (US);
Takeshi Horie, Campbell, CA (US);
Jeffrey D. Larson, Campbell, CA (US)

(73) Assignee: Fujitsu Limited, Kawasaki (JP)

( * ) Notice: Subject to any disclaimer, the term of this patent is extended or adjusted under 35 U.S.C. 154(b) by 636 days.

(21) Appl. No.: 09/653,154

(22) Filed: Aug. 31, 2000

(51) Int. Cl.[7] .................................................. G06F 15/16
(52) U.S. Cl. ........................................ 709/232; 710/105
(58) Field of Search ................................ 710/113, 306;
711/163, 150, 206; 709/250, 232; 370/231

(56) References Cited

U.S. PATENT DOCUMENTS

| | | | | |
|---|---|---|---|---|
| 4,754,484 A | | 6/1988 | Larkin et al. ................ 379/430 |
| 4,882,745 A | | 11/1989 | Silver ....................... 455/575.2 |
| 5,117,465 A | | 5/1992 | MacDonald ................. 381/379 |
| 5,369,857 A | | 12/1994 | Sacherman et al. ........... 29/594 |
| 5,381,486 A | | 1/1995 | Ludeke et al. .............. 381/375 |
| D361,066 S | | 8/1995 | Langhorn et al. | |
| 5,835,962 A | * | 11/1998 | Chang et al. ................ 711/206 |
| 6,108,739 A | * | 8/2000 | James et al. ................. 710/113 |
| 6,205,119 B1 | * | 3/2001 | Kaczynski .................... 370/231 |
| 6,393,489 B1 | * | 5/2002 | Sambamurthy et al. ...... 709/250 |
| 6,487,643 B1 | * | 11/2002 | Khare et al. ................. 711/150 |
| 6,606,695 B2 | * | 8/2003 | Kamano et al. ............. 711/163 |
| 6,647,453 B1 | * | 11/2003 | Duncan et al. .............. 710/306 |

* cited by examiner

*Primary Examiner*—John Follansbee
*Assistant Examiner*—Jungwon Chang
(74) *Attorney, Agent, or Firm*—Fenwick & West LLP (57) ABSTRACT

A method and apparatus for avoiding starvation at an initiator node in a computer network to which are connected at least one target node which provides service and a plurality of initiator nodes which request service from the target node. The method includes: when a request is received from the initiator node during a period that the target node is unable to provide service, returning a reject reply by attaching thereto reject time information that matches the period; when the target node is in a state capable of providing service, preferentially accepting a retry request carrying older reject time information; and when the target node is in the state capable of providing service, returning a reject reply by attaching thereto new reject time information in response to any first request received before retry requests arising from previously rejected requests are all accepted.

15 Claims, 9 Drawing Sheets

Fig.3A

REQUEST PACKET

Fig.3B

REPLY PACKET

METHOD AND APPARATUS FOR AVOIDING STARVATION IN COMPUTER NETWORK

RELATED APPLICATIONS

The present application relates to the subject matter of co-pending U.S. application Ser. No. 09/778,649, filed by Jeffrey D. Larson, et al. on Feb. 5, 2001 now U.S. Pat. No. 6,678,758.

BACKGROUND OF THE INVENTION

1. Field of the Invention

The present invention relates to a method and apparatus for avoiding starvation in a computer network.

2. Description of the Related Art

Generally, in a computer network, at least one target node which provides service and a plurality of initiator nodes which request service from the target node are connected to the network.

In such a computer network, a situation can occur where a service request sent from a particular initiator node is continually rejected at the target node and will not be accepted. This situation is known as starvation.

A variety of methods are practiced to avoid such starvation but, in any method, an area of a certain number of bits, as a field for carrying information for avoiding starvation, must be provided in a packet transferred between a target node and an initiator node. This results in an increase in communication traffic.

SUMMARY OF THE INVENTION

The present invention has been devised in view of the above problem, and an object of the invention is to provide a method and apparatus for avoiding starvation in a computer network, capable of minimizing the number of bits of the field that must be provided, within a packet, to avoid starvation.

To achieve the above object, according to the present invention, there is provided a method for avoiding starvation at an initiator node in a computer network to which are connected at least one target node which provides service and a plurality of initiator nodes which request service from the target node, the method comprising: an operation whereby, when a request is received from the initiator node during a period that the target node is unable to provide service, a reject reply is returned by attaching thereto reject time information that matches the period; an operation whereby, when the target node is in a state capable of providing service, a retry request carrying older reject time information is preferentially accepted; and an operation whereby, when the target node is in the state capable of providing service, a reject reply is returned by attaching thereto new reject time information in response to any first request received before retry requests arising from previously rejected requests are all accepted.

According to the present invention, there is also provided a method for avoiding starvation at an initiator node in a computer network to which are connected at least one target node which provides service and a plurality of initiator nodes which request service from the target node, the method comprising: (a) an operation whereby, when a first request is received at the target node when the target node is in a state capable of providing service, the first request is accepted; (b) an operation whereby, when a first request is received at the target node after the target node has moved to a state incapable of providing service, a reject reply is returned in response to the first request by attaching thereto reject time information consisting of at least one bit; (c) an operation whereby, when a retry request is received at the target node after the target node is restored to the state capable of providing service, the retry request is accepted depending on the reject time information attached to the retry request; and (d) an operation whereby, at the target node staying in the state capable of providing service, when a retry request is received, the retry request is processed in the same manner as in the operation (c), while when a first request is received, a reject reply is returned by attaching thereto reject time information.

According to the present invention, there is also provided a method for avoiding starvation at an initiator node in a computer network to which are connected at least one target node which provides service and a plurality of initiator nodes which request service from the target node, the method comprising: (a) an operation whereby, at the target node, a first parameter CE consisting of at least one bit, a second parameter SE consisting of the same number of bits as the number of bits of the first parameter, a third parameter CC consisting of the number of bits determined by the number of the plurality of initiator nodes, and a fourth parameter SC consisting of the same number of bits as the number of bits of the third parameter are all initialized to 0; (b) an operation whereby the initiator node sends a first request to the target node; (c) an operation whereby, when the first request is received at the target node, if CE=SE and SC=0 and if the target node is in a state capable of providing service, the first request is accepted; (d) an operation whereby, when the first request is received at the target node, if CE=SE and SC>0 or if CE=SE and the target node is in a state incapable of providing service, then the CE is incremented, the CC is set to 1, and in response to the first request a reject reply is returned by attaching thereto the value of the CE; (e) an operation whereby, when the first request is received at the target node, if CE≠SE, the CC is incremented and a reject reply is returned by attaching thereto the value of the CE; (f) an operation whereby the initiator node that received the reject reply sends a retry request to the target node by attaching thereto a fifth parameter RE whose value is equal to the value of the CE attached to the reject reply; (g) an operation whereby, when the retry request is received at the target node, if CE=SE and SC=0 and if the target node is in the state capable of providing service, the retry request is accepted; (h) an operation whereby, when the retry request is received at the target node, if RE=SE+1 and SC=0 and if the target node is in the state capable of providing service, then the SE is incremented, the SC is set to CC-1, and the retry request is accepted; (i) an operation whereby, when the retry request is received at the target node, if RE=SE and SC>0 and if the target node is in the state capable of providing service, then the SC is decremented and the retry request is accepted; and (j) an operation whereby, when the retry request is received at the target node, if any of execution conditions in the operations (g), (i), and (j) is not satisfied, a reject reply is returned by attaching thereto the value of the RE in response to the retry request.

According to the present invention, there is also provided an apparatus for implementing each of the above methods. According to the present invention, there is also provided a recording medium readable by the apparatus and storing thereon a program for implementing each of the above methods.

BRIEF DESCRIPTION OF THE DRAWINGS

Further features and advantages of the present invention will be apparent from the following description with reference to the accompanying drawings, in which.

DESCRIPTION OF THE PREFERRED EMBODIMENTS

Figure 1:
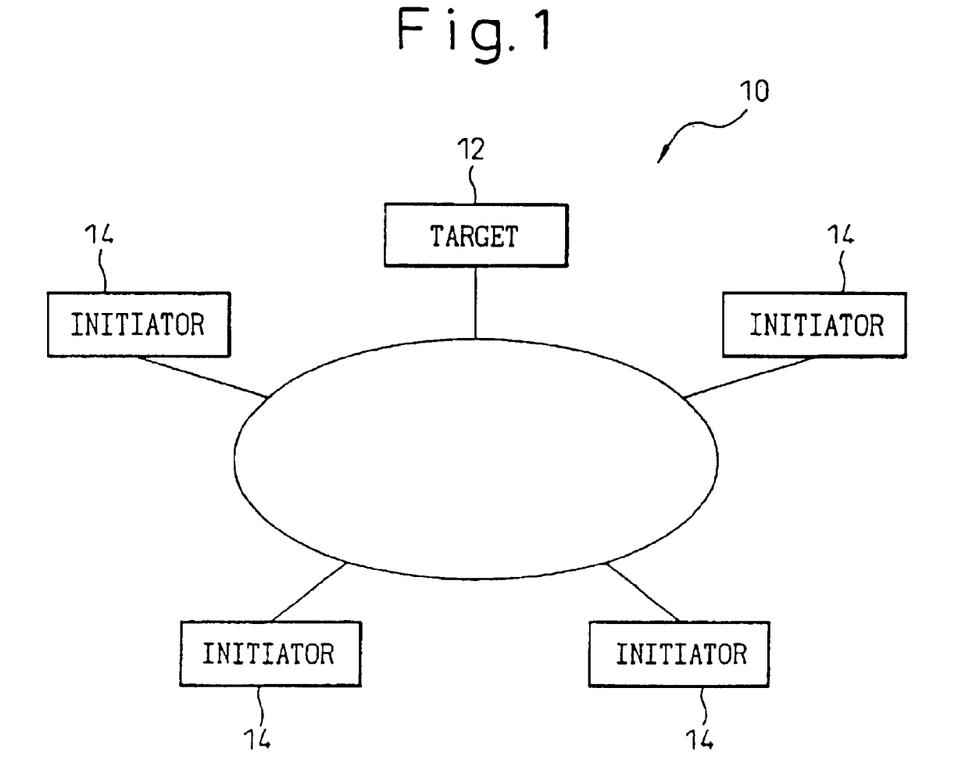
FIG. 1 is a diagram showing one example of a computer network to which the present invention may be applied.

FIG. 1 is a diagram showing a computer network 10 to which the present invention may be applied. To the computer network 10 are connected a computer 12 as one target node which provides service and computers 14 as a plurality of initiator nodes which request service from the target node. The computer network 10 shown in FIG. 1 has a ring topology, but the present invention can also be applied to a computer network of another topology such as a star topology or bus topology as long as the topology is such that at least one target node and a plurality of initiator nodes are connected to the network.

Figure 2:
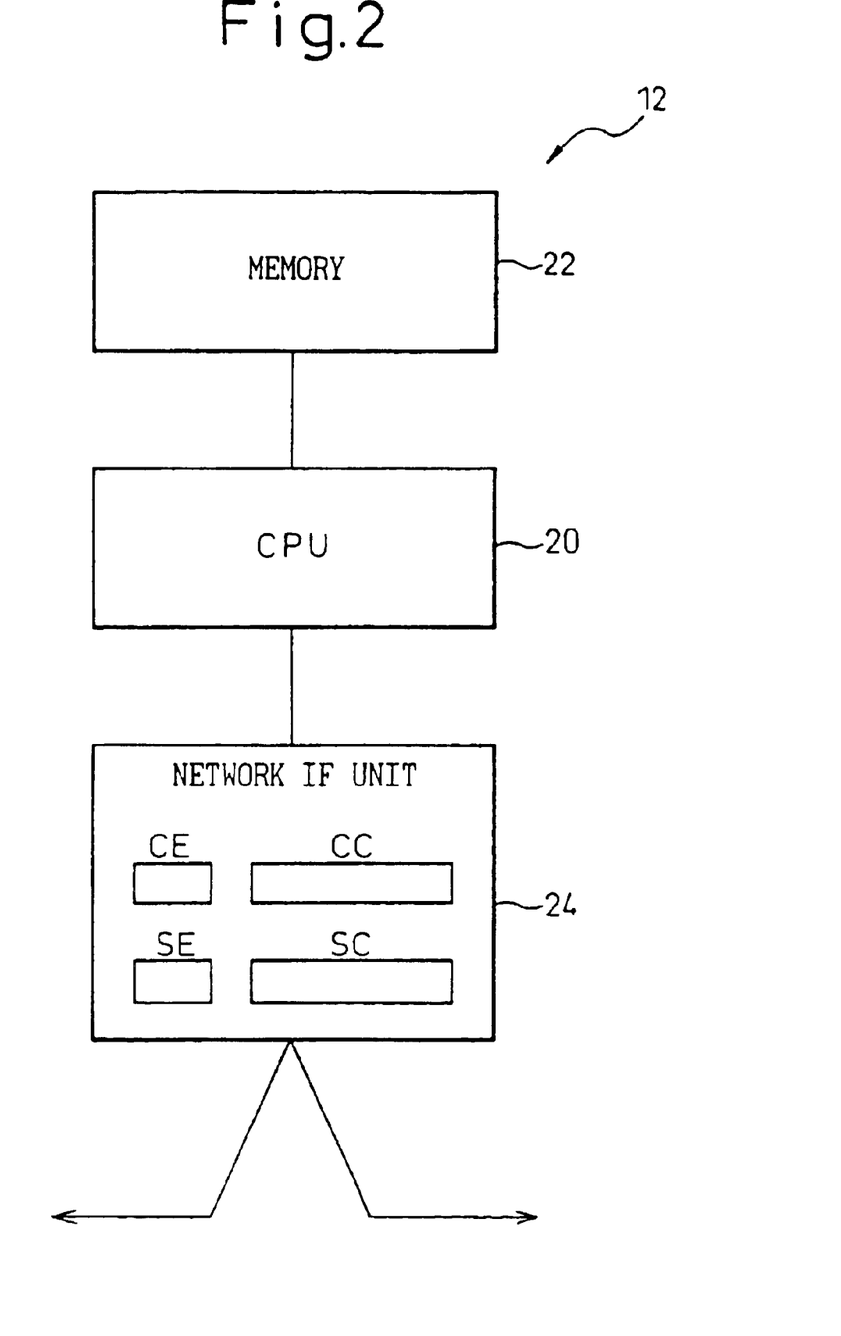
FIG. 2 is a diagram showing one example of the hardware configuration of a target node carrying out the present invention.

FIG. 2 is a diagram showing one example of the hardware configuration of the target node 12 in FIG. 1. As shown in the figure, the target node 12 consists essentially of a central processing unit (CPU) 20, a memory 22, and a network interface unit 24. The CPU 20 executes programs loaded into the memory 22 from various recording media.

The network interface unit 24 includes a register for storing a collect epoch (CE), a parameter consisting of at least one bit and used in the processing described later, and a register for storing a service epoch (SE), a parameter consisting of the same number of bits as that of the CE. The network interface unit 24 further includes a counter CC corresponding to the CE and a counter SC corresponding to the SE. The number of bits of the counter CC is equal to that of the counter SC, and is determined according to the number of initiator nodes 14.

Figure 3A:
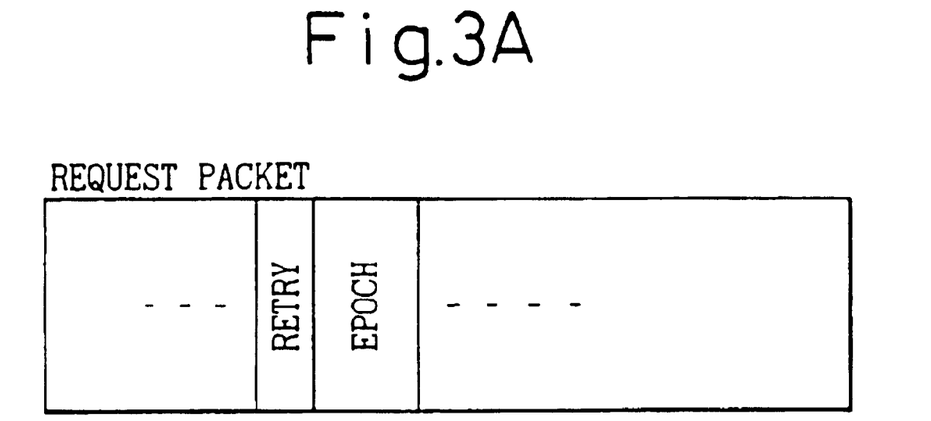
FIG. 3A is a diagram showing the format of a request packet transmitted from an initiator node to a target node.

FIG. 3A is a diagram showing the format of a request packet transmitted from an initiator node 14 to the target node 12; only those portions concerned with the present invention are shown here. The RETRY field consists of one bit; a bit value of 0 indicates that the request packet is related to a first request, while a bit value of 1 indicates that the packet is sent as a retry request which is issued after the previous request is rejected. The EPOCH field consists of the same number of bits as the number of bits of the collect epoch CE or the service epoch SE, and has meaning only when the value of the RETRY bit is 1. The meaning of each field will become apparent in the description given later.

Figure 3B:
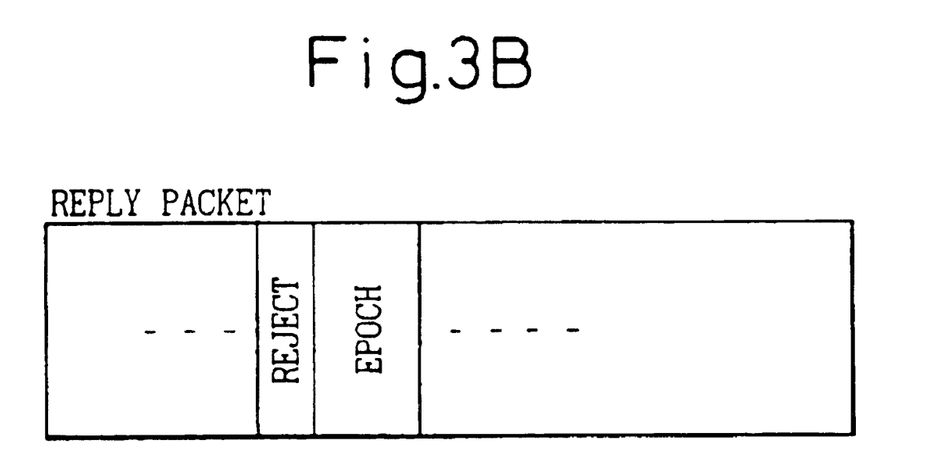
FIG. 3B is a diagram showing the format of a reply packet transmitted from the target node to the initiator node.

FIG. 3B is a diagram showing the format of a reply packet transmitted from the target node 12 to the initiator node 14; only those portions concerned with the present invention are shown here. The REJECT field consists of one bit. The target node 12 responds by setting the REJECT bit to 0 when accepting the request from the initiator node 14, and by setting the REJECT bit to 1 when rejecting the request. In FIG. 3B also, the EPOCH field consists of the same number of bits as the number of bits of the collect epoch CE or the service epoch SE, and has meaning only when the value of the REJECT bit is 1. The meaning of each field will become apparent in the description given later.

Figure 4A:
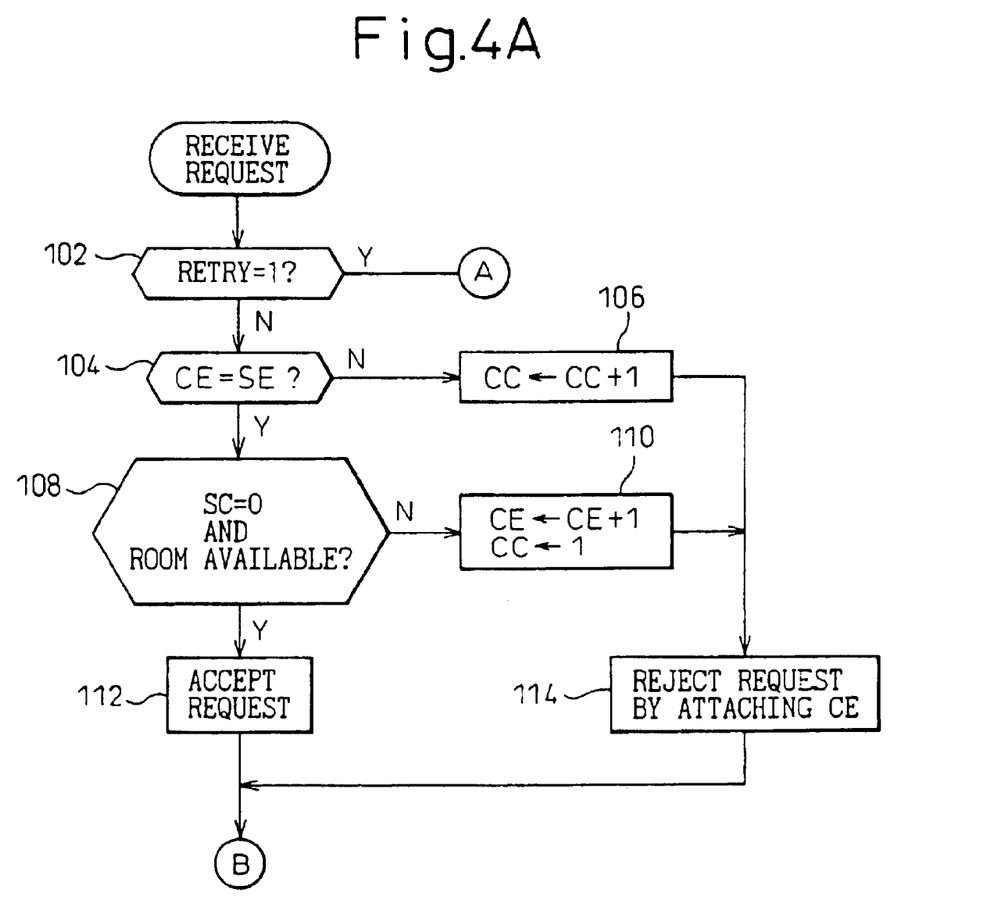
FIGS. 4A and 4B are a flowchart illustrating the sequence of processing performed at the target node when a request is received.
Figure 4B:
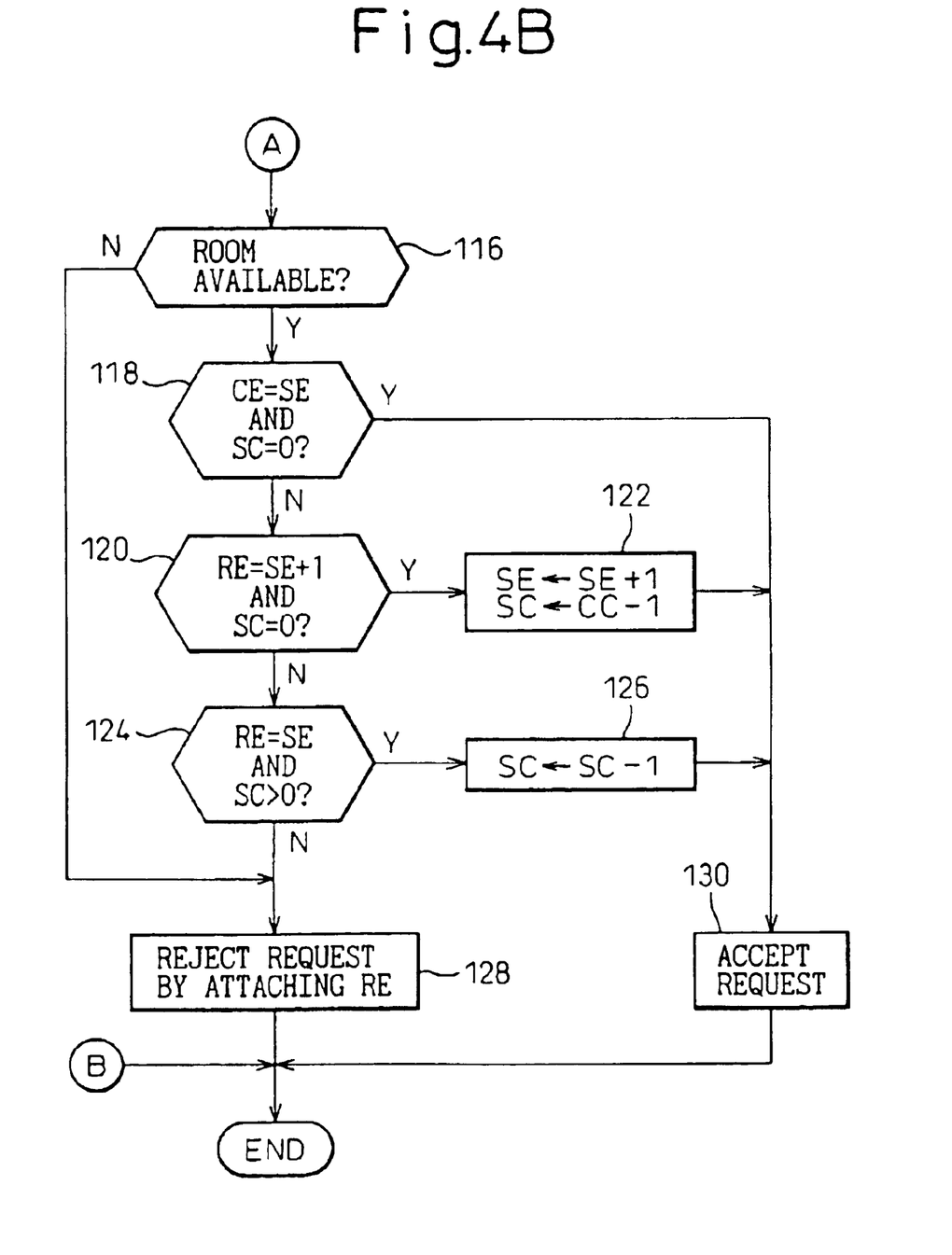

FIGS. 4A and 4B are a flowchart illustrating the sequence of processing performed at the target node 12 when a request is received. At the target node 12, the collect epoch CE, the service epoch SE, the collect counter CC, and the service counter SC are all initialized to 0 during system power up.

When a request is received from an initiator node 14, first it is determined in operation 102 whether the RETRY bit in the request packet (FIG. 3A) is set to 1 or not. When RETRY=1, that is, when the received request is a retry request, the process proceeds to operation 116; on the other hand, when RETRY=0, that is, when the received request is the first request, the process proceeds to operation 104.

In operation 104, it is determined whether the value of the collect epoch is equal to the value of the service epoch; when CE=SE, the process proceeds to operation 108, but when CE≠SE, the process proceeds to operation 106. In operation 108, it is determined whether the service counter indicates 0 and, at the same time, it is determined whether the requested service is available for delivery. The state of the service being available for delivery will be described as "room available". When the conditions in operation 108 are both satisfied, the process proceeds to operation 112 where the first request is accepted and the reply packet (FIG. 3B) with the REJECT bit set to 0 is sent to the requesting initiator node 14.

On the other hand, if the conditions in operation 108 are not satisfied, the process proceeds to operation 110 where the collect epoch CE is incremented and the collect counter CC is set to 1. Next, in operation 114, the REJECT bit is set to 1, and the reply packet (FIG. 3B) is sent to the requesting initiator node 14. At this time, the current value of the collect epoch CE is set in the EPOCH field of the reply packet.

In operation 106, which is carried out when it is determined that CE≠SE in operation 104, the collect counter CC is incremented. Next, the processing in operation 114 described above is carried out.

Figure 5:
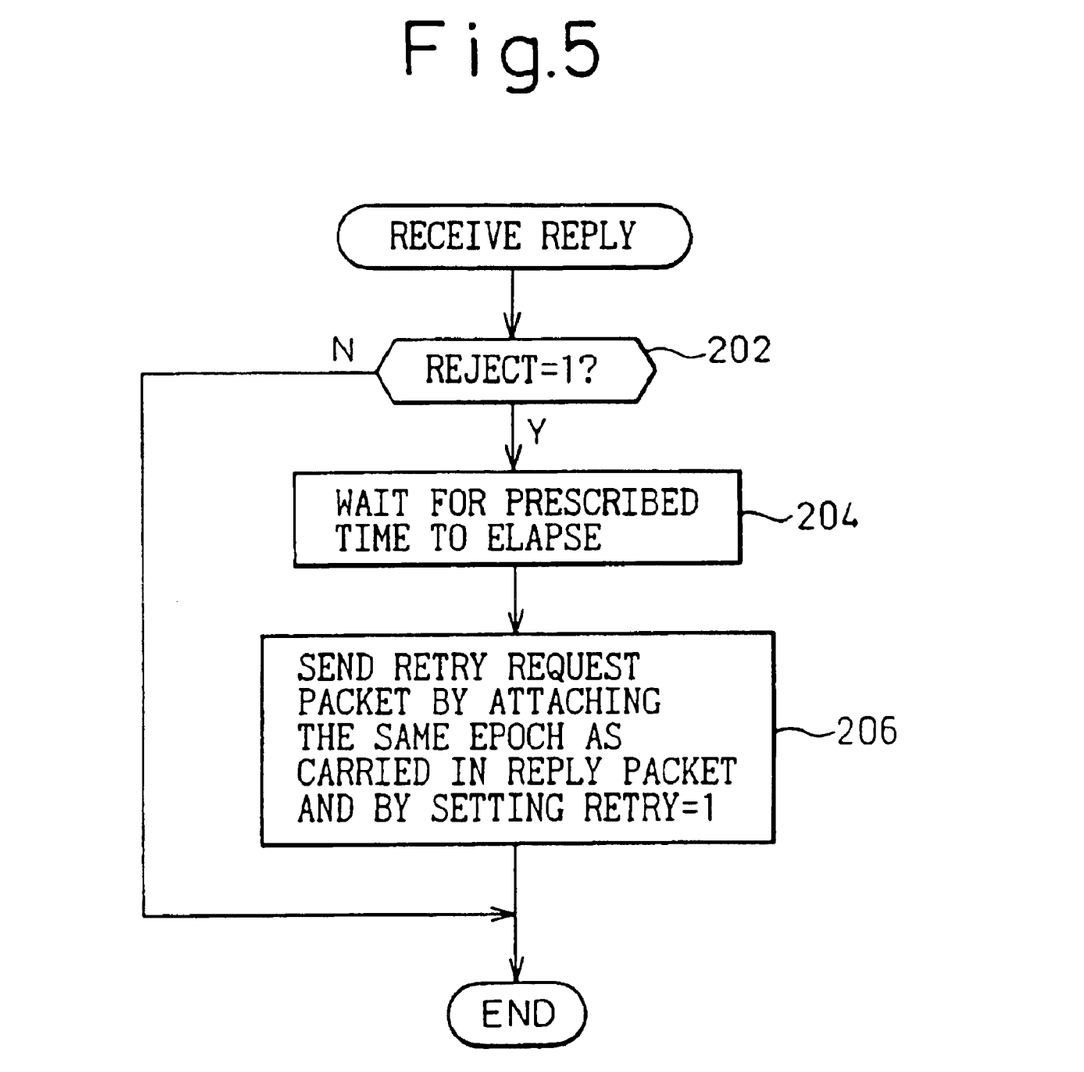
FIG. 5 is a flowchart illustrating the sequence of processing performed at the initiator node when a reply packet is received.

Before proceeding to the description of the process of FIG. 4B, the process performed at the initiator node when the reply packet is received will be described with reference to the flowchart of FIG. 5. When the reply from the target node 12 is received, first it is determined in operation 202 whether the REJECT bit in the reply packet (FIG. 3B) is set to 1 or not. When REJECT=1, that is, when the previously sent request has been rejected, the process proceeds to operation 204; on the other hand, when REJECT=0, that is, when the request is accepted, nothing is done.

In operation 204, a prescribed time interval is allowed to pass. Then, in the next operation 206, the RETRY bit is set to 1 in order to transmit a retry request and the request packet (3A) thus set is sent to the target node 12. At this time, the value of the EPOCH carried in the received reject reply packet is copied to the EPOCH field of the request packet.

Turning back to FIGS. 4A and 4B, in operation 116 which is carried out when it is determined that RETRY=1 in operation 102, it is determined whether the condition "room available" is satisfied; if the result shows YES, the process proceeds to operation 118, but if the result shows NO, the process proceeds to operation 128.

In operation 118, it is determined whether the value of the collect epoch CE is equal to the value of the service epoch SE and, at the same time, the service counter SC indicates 0. If the result shows YES, that is, if CE=SE and SC=0, the process proceeds to operation 130, but if the result shows NO, the process proceeds to operation 120. In operation 130, the retry request is accepted and the reply packet (FIG. 3B) with the REJECT bit now set to 0 is sent to the requesting initiator node 14.

In operation 120, the value carried in the EPOCH field of the request packet is taken as a request epoch RE, and it is determined whether the RE is equal to SE+1 and, at the same time, the service counter SC indicates 0. If the result shows YES, that is, if RE=SE+1 and SC=0, the process proceeds to operation 122, but if the result shows NO, the process proceeds to operation 124. In operation 122, the service epoch SE is incremented and the service counter SC is set to CC-1, after which the process proceeds to operation 130. In operation 130, the retry request is accepted as described above.

In operation 124, it is determined whether RE=SE and SC>0; if the result shows YES, the process proceeds to operation 126, but if the result shows NO, the process proceeds to operation 128. In operation 126, the service counter SC is decremented, and the process proceeds to operation 130. In operation 130, the retry request is accepted as described above.

On the other hand, in operation 128, the REJECT bit is set to 1 and the reply packet (FIG. 3B) thus set is sent to the requesting initiator node 14. At this time, the value carried in the EPOCH field of the received request packet, that is, the value of the request epoch RE, is set directly in the EPOCH field of the reply packet. The series of operations for processing the first request and the retry request is thus completed.

Figure 6:
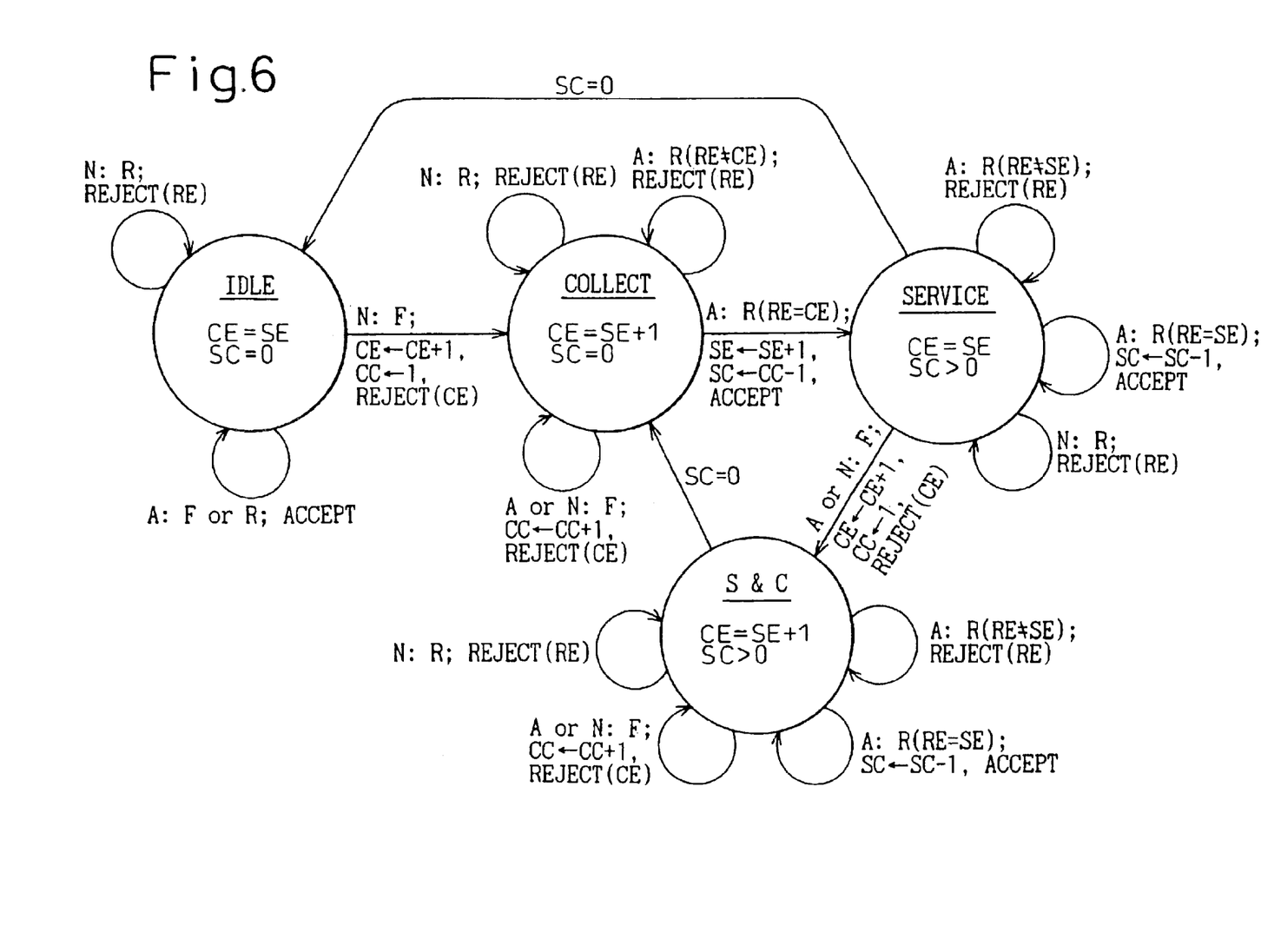
FIG. 6 is a diagram showing various states of the target nodes and actions and state transitions occurring at the target nodes.

Now, referring to FIG. 6, a description will be given of what state the target node 12 can take in accordance with the algorithm of FIGS. 4A and 4B and what action and state transition occur in response to a request sent from the initiator node 14. In FIG. 6, "A" indicates "room available" and "N" represents "room not available", while F designates a first request and R a retry request.

After initialization, CE=SE and SC=0. This state will be referred to as the idle state. Here, if a first request or a retry request arrives when the target node is in the idle state and when the condition "room available" holds, the target node accepts the request and stays in the idle state. In FIG. 6, this action and state transition pattern is indicated by an arrow exiting the circle of the idle state and represented by the description A: F or R; ACCEPT attached to the arrow.

If a retry request arrives when the target node is in the idle state and when the condition "room not available" holds, the target node returns a reject reply by attaching to it the same request epoch RE as attached to the retry request. This pattern is indicated by an arrow exiting the circle of the idle state and represented by the description

N: R; REJECT(RE)

attached to the arrow. Actions and state transitions are likewise shown hereinafter.

Next, if a first request arrives when the target node is in the idle state and when the condition "room not available" holds, the target node increments the CE, sets the CC to 1, and returns a reject reply by attaching the current CE to it, while at the same time, making a transition to a collect state. The collect state refers to the state in which CE=SE+1 and SC=0.

If a first request arrives in the collect state, regardless of the condition "room available" or "room not available", the target node increments the CC and returns a reject reply by attaching the current CE to it. If a retry request arrives when the target node is in the collect state and when the condition "room not available" holds, the target node returns a reject reply by attaching to it the same request epoch RE as attached to the retry request. When in the collect state and when the condition "room available" holds, if a retry request arrives whose RE value is not equal to the current CE, the target node returns a reject reply by attaching the same RE to it.

On the other hand, when in the collect state and when the condition "room available" holds, if a retry request arrives whose RE value is equal to the current CE, the target node increments the SE, sets the SC to CC-1, accepts the retry request, and makes a transition to a service state. The service state refers to the state in which CE=SE and SC>0. This action pattern is indicated by an arrow exiting the collect state and represented by the description

A: R(RE=CE); SE←SE+1, SC←CC-1, ACCEPT attached to the arrow.

If a retry request arrives when the target node is in the service state and when the condition "room not available" holds, the target node returns a reject reply by attaching to it the same RE as attached to the retry request. When in the service state and when the condition "room available" holds, if a retry request arrives whose RE value is not equal to the current SE, the target node returns a reject reply by attaching the same RE to it.

On the other hand, when in the service state and when the condition "room available" holds, if a retry request arrives whose RE value is equal to the current SE, the target node decrements the SC and accepts the retry request. Here, if SC=0 as the result of decrementing the SC, a transition is made to the idle state.

If a first request arrives in the service state, regardless of the condition "room available" or "room not available", the target node increments the CE, sets the CC to 1, and returns a reject reply by attaching the current CE to it, while at the same time, making a transition to a service & collect state. The service & collect state refers to the state in which CE=SE+1 and SC>0. When in the service & collect state and when the condition "room available" holds, if a retry request arrives whose RE value is not equal to the current SE, the target node returns a reject reply by attaching the same RE to it. If a retry request arrives when the condition "room not available" holds, the target node returns a reject reply by attaching to it the same RE as attached to the retry request.

Further, in the service & collect state, if a first request arrives, regardless of the condition "room available" or "room not available", the target node increments the CC and returns a reject reply by attaching the current CE to it. When the condition "room available" holds, if a retry request arrives whose RE value is equal to the current SE, the target node decrements the SC and accepts the retry request. Here, if SC=0 as the result of decrementing the SC, a transition is made to the collect state.

As can be seen from the above description, the CE always takes a value equal to that of the SE or advanced by 1 relative to that of the SE. In the collect state or the service & collect state where the CE takes a value advanced by 1 relative to that of the SE, the first request is rejected and the number of rejected requests is counted as CC. In the service state or the service & collect state where SC>0, the SC whose initial value is equal to the CC representing the result of the counting is decremented each time a retry request whose RE value is equal to the SE is accepted. In the service & collect state, any first request is continually rejected by attaching the current CE, until the SC becomes equal to 0. In this way, the target node preferentially processes previously rejected requests in sequence, and starvation is thus avoided. The epoch functions as a parameter defining reject time information.

Figure 7:
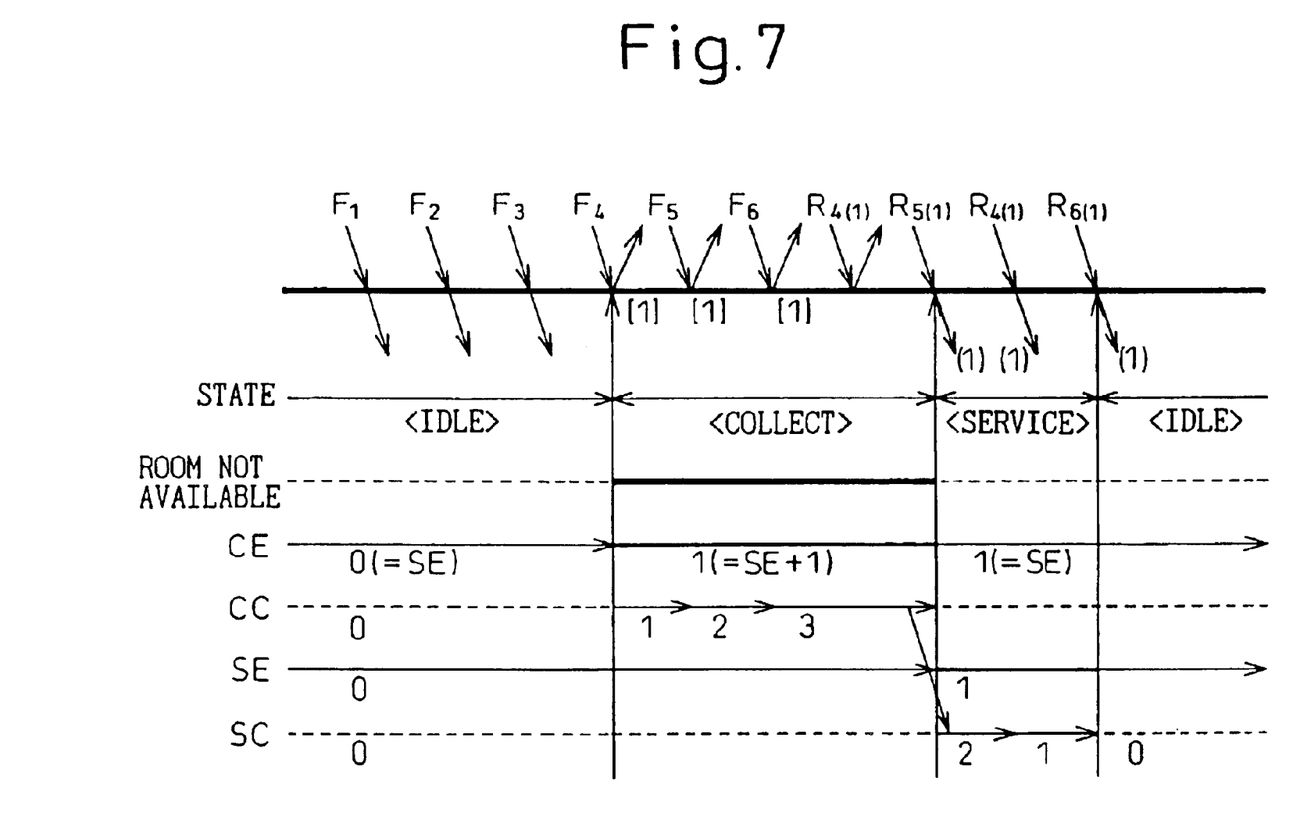
FIG. 7 is a sequence chart showing one typical operational example.
Figure 8:
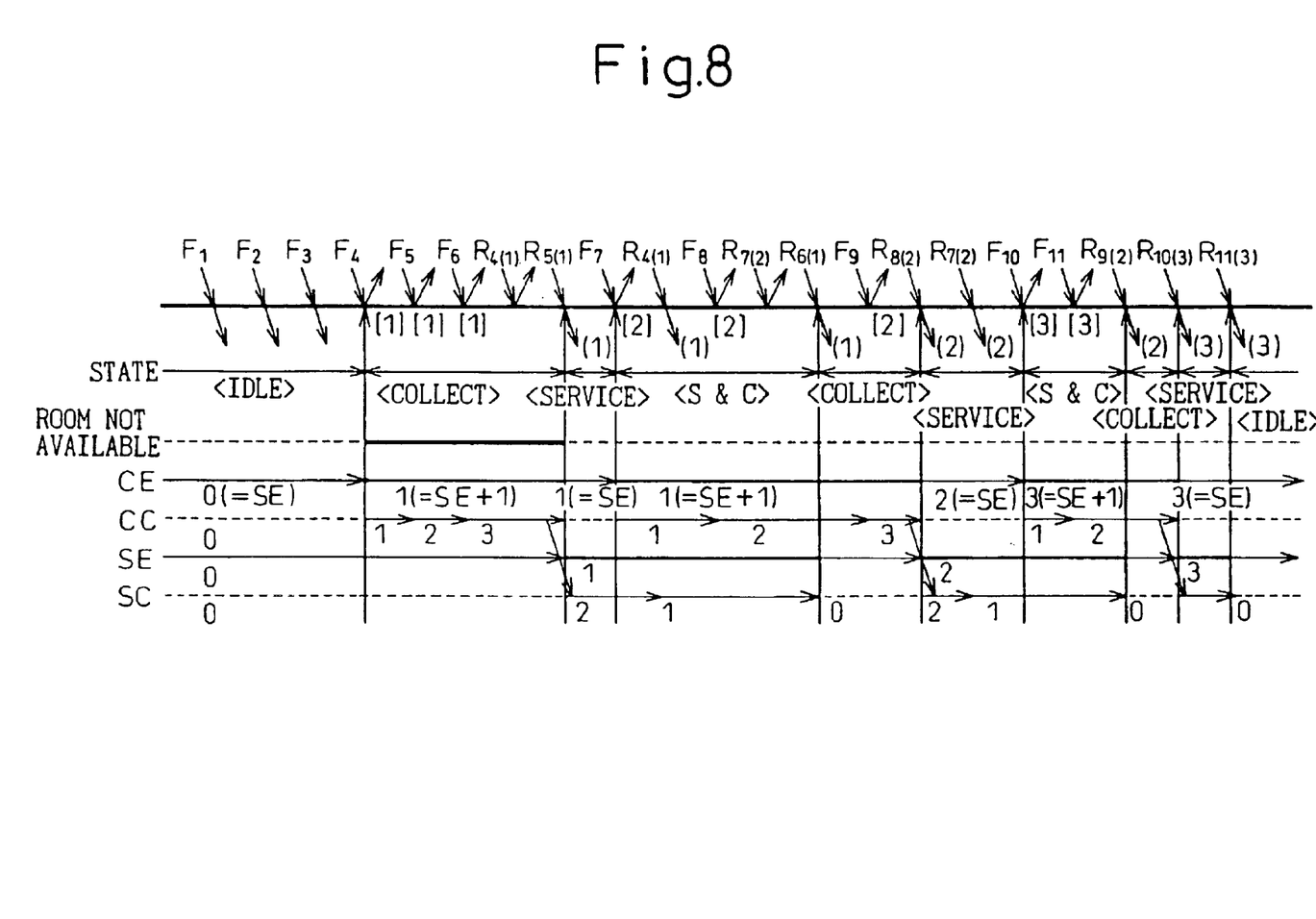
FIG. 8 is a sequence chart showing another typical operational example.

Typical operational examples are shown in the sequence charts of FIGS. 7 and 8 to facilitate understanding of the present invention. First, the example of FIG. 7 will be described. When the collect epoch CE, the collect counter CC, the service epoch SE, and the service counter SC are all cleared to 0 by initialization and the target node is in the idle state (CE=SE and SC=0), packets $F_1$, $F_2$, and $F_3$, each relating to a first request, are sent and are all accepted.

Before long, the target node becomes "room not available"; at this time, when a packet $F_4$ relating to a first request arrives, the CE is incremented to 1, the CC is set to 1, and a reject reply is returned by attaching CE=1 to it. As a result, the target node makes a transition to the collect state (CE=SE+1 and SC=0).

In this collect state, when packets $F_5$ and $F_6$, each relating to a first request, arrive, reject replies are likewise returned by attaching CE=1 to each, and the CC is incremented from 1 to 2 and from 2 to 3. At this time, when a packet $R_4$ (with RE=1 attached to it) arrives which carries a retry request for the packet $F_4$ relating to the previously rejected first request, a reject reply is returned by attaching the same RE to it.

Before long, the target node becomes "room available". At this time, when a packet $R_5$ (RE=1) carrying a retry request for the previously rejected $F_5$ arrives, the SE is incremented to 1, the SC is set to CC-1=3-1=2, and the retry request is accepted. As a result, the target node makes a transition to the service state (CE=SE and SC>0).

In this service state, when a packet $R_4$ (RE=1) carrying a retry request for the previously rejected $F_4$ arrives, the retry request is accepted and the SC is decremented to 1. Next, when a packet $R_6$ (RE=1) carrying a retry request for the previously rejected $F_6$ arrives, the retry request is accepted and the SC is decremented to 0. As a result, the target node returns to the idle state (CE=SE and SC=0).

Next, the sequence chart of FIG. 8 will be described. In this example, transitions are made from the idle state to the collect state, then to the service state in the same manner as in the example of FIG. 7. In the example of FIG. 8, however, a packet $F_7$ relating to a first request arrives when the target node is in the service state; as a result, the CE is incremented to 2, the CC is set to 1, and the request is rejected by attaching CE=2. Then, the target node makes a transition to the service & collect state (CE=SE+1 and SC>0).

In this service & collect state, a retry request whose RE value is equal to the current SE=1 is accepted and the SC is decremented, while on the other hand, any first request is rejected by attaching CE=2. When SC becomes equal to 0, the target node makes a transition to the collect state (CE=SE+1 and SC=0). The operation thereafter is self-explanatory. In this way, the target node makes transitions between the four states.

According to the above explanation, the first request will not be accepted until after retry requests for the previously rejected requests have all been accepted, that is, until after the SC becomes equal to 0. In this case, the epoch could do with one bit. However, in depending on the system, there can occur situations where retry requests are not made for some reason. In such situations, the process cannot proceed further since the SC does not become equal to 0.

In view of this, it is effective to include a timeout process whereby the time elapsing until the SC becomes 0 is monitored and, when a predefined time interval has elapsed, the SC is forcefully reset to 0 to allow the process to proceed further. When providing such a timeout process, it would be worthwhile to construct the epoch with multiple bits. The reason is that, if the epoch consists of multiple bits, when a retry request arrives, the time that the previous request was rejected can be recognized and processing appropriate to the result can be performed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for avoiding starvation at an initiator node in a computer network to which are connected at least one target node which provides service and a plurality of initiator nodes which request service from said target node, said method comprising the operations of:

when a first request is received from said initiator node during a period that said target node is unable to provide service, returning a first reject reply by attaching thereto reject time information that matches said period;

when said target node is in a state capable of providing service, preferentially accepting a retry request carrying older reject time information; and at said target node staying in the state capable of providing service, when the retry request is received, processing said retry request while when a second request is received, returning a second reject reply by attaching thereto new reject time information.

2. A method for avoiding starvation at an initiator node in a compute network to which are connected at least one target node which provides service and a plurality of initiator nodes which request service from said target node, said method comprising the operations of:

(a) when a first request is received at said target node when said target node is in a state capable of providing service, accepting said first request;

(b) when a first request is received at said target node after said target node has moved to a state incapable of providing service, returning a reject reply in response to said first request by attaching thereto reject time information comprising at least one bit;

(c) when a retry request is received at said target node after said target node is restored to the state capable of providing service, accepting said retry request depending on the reject time information attached to said retry request; and (d) at said target node staying in the state capable of providing service, when a retry request is received, processing said retry request in the same manner as in said operation (c), while when a first request is received, returning a reject reply by attaching thereto reject time information.

3. A method for avoiding starvation at an initiator node in a computer network to which are connected at least one target node which provides service and a plurality of initiator nodes which request service from said target node, said method comprising the operations of:

(a) at said target node, initializing to 0 all of a first collect epoch (CE) parameter comprising at least one bit, a second service epoch (SE) parameter comprising the same number of bits as the number of bits of said first parameter, a third collect counter (CC) parameter comprising the number of bits as determined by the number of said plurality of initiator nodes, and a fourth service counter (SC) parameter comprising the same number of bits as the number of bits of said third parameter;

(b) at said initiator node, sending a first request to said target node;

(c) when said first request is received at said target node, if CE=SE and SC=0 and if said target node is in a state capable of providing service, accepting said first request;

(d) when said first request is received at said target node, if CE=SE and SC>0 or if CE=SE and said target node is in a state incapable of providing service, incrementing said CE, setting said CC to 1, and returning a reject reply by attaching thereto the value of said CE in response to said first request;

(e) when said first request is received at said target node, if CE≠SE, incrementing said CC and returning a reject reply by attaching thereto the value of said CE;

(f) at said initiator node that received said reject reply, sending a retry request to said target node by attaching thereto a fifth parameter RE whose value is equal to the value of said CE attached to said reject reply;

(g) when said retry request is received at said target node, if CE=SE and SC0 and if said target node is in the state capable of providing service, accepting said retry request;

(h) when said retry request is received at said target node, if RE=SE+1 and SC=0 and if said target node is in the state capable of providing service, incrementing said SE, setting said SC to CC-1, and accepting said retry request;

(i) when said retry request is received at said target node, if RE=SE and SC>0 and if said target node is in the state capable of providing service, decrementing said SC and accepting said retry request; and (j) when said retry request is received at said target node, if any of execution conditions in said operations (g), (i), and (j) is not satisfied, returning a reject reply by attaching thereto the value of said RE in response to said retry request.

4. A method carried out at a target node for avoiding starvation at an initiator node in a computer network to which are connected at least one target node which provides service and a plurality of initiator nodes which request service from said target node, said method comprising the operations of:

(a) initializing to 0 all of a first collect epoch (CE) parameter comprising at least one bit, a second service epoch (SE) parameter comprising the same number of bits as the number of bits of said first parameter, a third collect counter (CC) parameter comprising the number of bits as determined by the number of said plurality of initiator nodes, and a fourth service counter (SC) parameter comprising the same number of bits as the number of bits of said third parameter;

(b) when a first request is received, if CE=SE and SC=0 and if said target node is in a state capable of providing service, accepting said first request;

(c) when a first request is received, if CE=SE and SC>0 or if CE=SE and said target node is in a state incapable of providing service, incrementing said CE, setting said CC to 1, and returning a reject reply by attaching thereto the value of said CE in response to said first request;

(d) when a first request is received, if CE≠SE, incrementing said CC and returning a reject reply by attaching thereto the value of said CE;

(e) when a retry request is received, if CE=SE and SC=0 and if said target node is in the state capable of providing service, accepting said retry request;

(f) when a retry request is received, if RE=SE+1 and SC=0 and if said target node is in the state capable of providing service, incrementing said SE, setting said SC to CC-1, and accepting said retry request;

(g) when a retry request is received, if RE=SE and SC>0 and if said target node is in the state capable of providing service, decrementing said SC and accepting said retry request; and (h) when a retry request is received, if any of execution conditions in said operations (e), (f), and (g) is not satisfied, returning a reject reply by attaching thereto the value of said RE in response to said retry request.

5. A method carried out at an initiator node for avoiding starvation at said initiator node in a computer network to which are connected at least one target node which provides service and a plurality of initiator nodes which request service from said target node, said method comprising the operations of:

(a) sending a first request to said target node during a period that said target node is unable to provide service; and (b) when a reject reply is received from the target node in response to said first request, sending a retry request by attaching thereto a parameter whose value is equal to the value of a parameter of reject time information attached to said reject reply.

6. An apparatus for avoiding starvation at an initiator node in a computer network to which are connected at least one target node which provides service and a plurality of initiator nodes which request service from said target node, said apparatus comprising:

means for, when a first request is received from said initiator node during a period that said target node is unable to provide service, returning a first reject reply by attaching thereto reject time information that matches said period;

means for, when said target node is in a state capable of providing service, preferentially accepting a retry request carrying older reject time information; and means for, when said target node staying in the state capable of providing service, when the retry request is received, processing said retry request while when a second request is received, returning a reject reply by attaching thereto new reject time information.

7. An apparatus for avoiding starvation at an initiator node in a computer network to which are connected at least one target node which provides service and a plurality of initiator nodes which request service from said target node, said apparatus comprising:

first means for, when a first request is received at said target node when said target node is in a state capable of providing service, accepting said first request;

second means for, when a first request is received at said target node after said target node has moved to a state incapable of providing service, returning a reject reply in response to said first request by attaching thereto reject time information comprising at least one bit;

third means for, when a retry request is received at said target node after said target node is restored to the state capable of providing service, accepting said retry request depending on the reject time information attached to said retry request; and fourth means for, at said target node staying in the state capable of providing service, when a retry request is received, processing said retry request in the same manner as processed by said third means, while when a first request is received, returning a reject reply by attaching thereto reject time information.

8. (Previously Presented) An apparatus for avoiding starvation at an initiator node in a computer network to which are connected at least one target node which provides service and a plurality of initiator nodes which request service from said target node, said apparatus comprising:

first means for, at said target node, initializing to 0 all of a first collect epoch (CE) parameter comprising at least one bit, a second service epoch (SE) parameter comprising the same number of bits as the number of bits of said first parameter, a third collect counter (CC) parameter comprising the number of bits as determined by the number of said plurality of initiator nodes, and a fourth service counter (SC) parameter comprising the same number of bits as the number of bits of said third parameter;

second means for, at said initiator node, sending a first request to said target node; third means for, when said first request is received at said target node, if CE=SE and SC=0 and if said target node is in a state capable of providing service, accepting said first request;

fourth means for, when said first request is received at said target node, if CE=SE and SC>0 or if CE=SE and said target node is in a state incapable of providing service, incrementing said CE, setting said CC to 1, and returning a reject reply by attaching thereto the value of said CE in response to said first request;

fifth means for, when said first request is received at said target node, if CE≠SE, incrementing said CC and returning a reject reply by attaching thereto the value of said CE;

sixth means for, at said initiator node that received said reject reply, sending a retry request to said target node by attaching thereto a fifth parameter RE whose value is equal to the value of said CE attached to said reject reply;

seventh means for, when said retry request is received at said target node, if CE=SE and SC=0 and if said target node is in the state capable of providing service, accepting said retry request;

eighth means for, when said retry request is received at said target node, if RE=SE+1 and SC=0 and if said target node is in the state capable of providing service, incrementing said SE, setting said SC to CC-1, and accepting said retry request;

ninth means for, when said retry request is received at said target node, if RE=SE and SC>0 and if said target node is in the state capable of providing service, decrementing said SC and accepting said retry request; and tenth means for, when said retry request is received at said target node, if any of operation conditions in said seventh, eighth, and ninth means is not satisfied, returning a reject reply by attaching thereto the value of said RE in response to said retry request.

9. An apparatus provided at a target node for avoiding starvation at an initiator node in a computer network to which are connected at least one target node which provides service and a plurality of initiator nodes which request service from said target node, said apparatus comprising:

first means for initializing to 0 all of a first collect epoch (CE) parameter comprising at least one bit, a second service epoch (SE) parameter comprising the same number of bits as the number of bits of said first parameter, a third collect counter (CC) parameter comprising the number of bits as determined by the number of said plurality of initiator nodes, and a fourth service counter (SC) parameter comprising the same number of bits as the number of bits of said third parameter;

second means for, when a first request is received, if CE=SE and SC=0 and if said target node is in a state capable of providing service, accepting said first request;

third means for, when a first request is received, if CE=SE and SC>0 or if CE=SE and said target node is in a state incapable of providing service, incrementing said CE, setting said CC to 1, and returning a reject reply by attaching thereto the value of said CE in response to said first request;

fourth means for, when a first request is received, if CE≠SE, incrementing said CC and returning a reject reply by attaching thereto the value of said CE;

fifth means for, when a retry request is received, if CE=SE and SC=0 and if said target node is in the state capable of providing service, accepting said retry request;

sixth means for, when a retry request is received, if RE=SE+1 and SC=0 and if said target node is in the state capable of providing service, incrementing said SE, setting said SC to CC-1, and accepting said retry request;

seventh means for, when a retry request is received, if RE=SE and SC>0 and if said target node is in the state capable of providing service, decrementing said SC and accepting said retry request; and eighth means for, when a retry request is received, if any of operation conditions in said fifth, sixth, and seventh means is not satisfied, returning a reject reply by attaching thereto the value of said RE in response to said retry request.

10. An apparatus provided at an initiator node for avoiding starvation at said initiator node in a computer network to which are connected at least one target node which provides service and a plurality of initiator nodes which request service from said target node, said apparatus comprising:

means for sending first request to said target node during a period that said target node is unable to provide service; and means for, when a reject reply is received from the target node in response to said first request, sending a retry request by attaching thereto a parameter whose value is equal to the value of a parameter of reject time information attached to said reject reply.

11. A recording medium readable by an apparatus for avoiding starvation at an initiator node in a computer network to which are connected at least one target node which provides service and a plurality of initiator nodes which request service from said target node, said recording medium having stored thereon a program for implementing:

a facility for, when a first request is received from said initiator node during a period that said target node is unable to provide service, returning a first reject reply by attaching thereto reject time information that matches said period;

a facility for, when said target node is in a state capable of providing service, preferentially accepting a retry request carrying older reject time information; and a facility for, at said target node staying in the state capable of providing service, when the retry request is received, processing said retry request while when a second request is received, returning a second reject reply by attaching thereto new reject time information.

12. A recording medium readable by an apparatus for avoiding starvation at an initiator node in a computer network to which are connected at least one target node which provides service and a plurality of initiator nodes which request service from said target node, said recording medium having stored thereon a program for implementing:

a first facility for, when a first request is received at said target node when said target node is in a state capable of providing service, accepting said first request;

a second facility for, when a first request is received at said target node after said target node has moved to a state incapable of providing service, returning a reject reply in response to said first request by attaching thereto reject time information comprising at least one bit;

a third facility for, when a retry request is received at said target node after said target node is restored to the state capable of providing service, accepting said retry request depending on the reject time information attached to said retry request; and a fourth facility for, at said target node staying in the state capable of providing service, when a retry request is received, processing said retry request in the same manner as processed by said third facility, while when a first request is received, returning a reject reply by attaching thereto reject time information.

13. A recording medium readable by an apparatus for avoiding starvation at an initiator node in a computer network to which are connected at least one target node which provides service and a plurality of initiator nodes which request service from said target node, said recording medium having stored thereon a program for implementing:

a first facility for, at said target node, initializing to 0 all of a first collect epoch (CE) parameter comprising at least one bit, a second service epoch (SE) parameter comprising the same number of bits as the number of bits of said first parameter, a third collect counter (CC) parameter comprising the number of bits as determined by the number of said plurality of initiator nodes, and a fourth service counter (SC) parameter comprising the same number of bits as the number of bits of said third parameter;

a second facility for, at said initiator node, sending a first request to said target node;

a third facility for, when said first request is received at said target node, if CE=SE and SC=0 and if said target node is in a state capable of providing service, accepting said first request;

a fourth facility for, when said first request is received at said target node, if CE=SE and SC>0 or if CE=SE and said target node is in a state incapable of providing service, incrementing said CE, setting said CC to 1, and returning a reject reply by attaching thereto the value of said CE in response to said first request;

a fifth facility for, when said first request is received at said target node, if CE≠SE, incrementing said CC and returning a reject reply by attaching thereto the value of said CE;

a sixth facility for, at said initiator node that received said reject reply, sending a retry request to said target node by attaching thereto a fifth parameter RE whose value is equal to the value of said CE attached to said reject reply;

a seventh facility for, when said retry request is received at said target node, if CE=SE and SC=0 and if said target node is in the state capable of providing service, accepting said retry request;

an eighth facility for, when said retry request is received at said target node, if RE=SE+1 and SC=0 and if said target node is in the state capable of providing service, incrementing said SE, setting said SC to CC-1, and accepting said retry request;

a ninth facility for, when said retry request is received at said target node, if RE=SE and SC>0 and if said target node is in the state capable of providing service, decrementing said SC and accepting said retry request; and a tenth facility for, when said retry request is received at said target node, if any of operation conditions in said seventh, eighth, and ninth facilities is not satisfied, returning a reject reply by attaching thereto the value of said RE in response to said retry request.

14. A recording medium readable by a target node in a computer network to which are connected at least one target node which provides service and a plurality of initiator nodes which request service from said target node, said recording medium having stored thereon a starvation avoiding program for implementing:

a first facility for initializing to 0 all of a first collect epoch (CE) parameter comprising at least one bit, a second service epoch (SE) parameter comprising the same number of bits as the number of bits of said first parameter, a third collect counter (CC) parameter comprising the number of bits as determined by the number of said plurality of initiator nodes, and a fourth service counter (SC) parameter comprising the same number of bits as the number of bits of said third parameter;

a second facility for, when a first request is received, if CE=SE and SC=0 and if said target node is in a state capable of providing service, accepting said first request;

a third facility for, when a first request is received, if CE=SE and SC>0 or if CE=SE and said target node is in a state incapable of providing service, incrementing said CE, setting said CC to 1, and returning a reject reply by attaching thereto the value of said CE in response to said first request;

a fourth facility for, when a first request is received, if CE≠SE, incrementing said CC and returning a reject reply by attaching thereto the value of said CE;

a fifth facility for, when a retry request is received, if CE=SE and SC=0 and if said target node is in the state capable of providing service, accepting said retry request;

a sixth facility for, when a retry request is received, if RE=SE+1 and SC=0 and if said target node is in the state capable of providing service, incrementing said SE, setting said SC to CC-1, and accepting said retry request;

a seventh facility for, when a retry request is received, if RE=SE and SC>0 and if said target node is in the state capable of providing service, decrementing said SC and accepting said retry request; and an eighth facility for, when a retry request is received, if any of operation conditions in said fifth, sixth, and seventh facilities is not satisfied, returning a reject reply by attaching thereto the value of said RE in response to said retry request.

15. A recording medium readable by an initiator node in a computer network to which are connected at least one target node which provides service and a plurality of initiator nodes which request service from said target node, said recording medium having stored thereon a starvation avoiding program for implementing:

a facility for sending a first request to said target node during a period that said target node is unable to provide service; and a facility for, when a reject reply is received from the target node in response to said first request, sending a retry request by attaching thereto a parameter whose value is equal to the value of a parameter of reject time information attached to said reject reply.

* * * * *

UNITED STATES PATENT AND TRADEMARK OFFICE
CERTIFICATE OF CORRECTION

PATENT NO. : 6,799,219 B1
DATED : September 28, 2004
INVENTOR(S) : Hirohide Sugahara Takashi Miyoshi, Takeshi Horie and Jeffrey D. Larson

It is certified that error appears in the above-identified patent and that said Letters Patent is hereby corrected as shown below:

Column 8,
Line 43, please delete "compute" and insert -- computer --

Column 9,
Line 33, please delete "SC0" and insert -- SC=0 --

Signed and Sealed this

Twenty-first Day of December, 2004

JON W. DUDAS
*Director of the United States Patent and Trademark Office*